US012017151B2

(12) United States Patent
Wu

(10) Patent No.: US 12,017,151 B2
(45) Date of Patent: Jun. 25, 2024

(54) QUADCOPTER TOY

(71) Applicant: Xukun Wu, Shantou (CN)

(72) Inventor: Xukun Wu, Shantou (CN)

( * ) Notice: Subject to any disclaimer, the term of this patent is extended or adjusted under 35 U.S.C. 154(b) by 0 days.

(21) Appl. No.: 18/429,596

(22) Filed: Feb. 1, 2024

(65) Prior Publication Data

US 2024/0173639 A1 May 30, 2024

(30) Foreign Application Priority Data

Dec. 23, 2023 (CN) ......................... 202311784701.4

(51) Int. Cl.
*A63H 27/00* (2006.01)
*F21V 33/00* (2006.01)
*F21Y 115/10* (2016.01)

(52) U.S. Cl.
CPC ........... *A63H 27/12* (2013.01); *F21V 33/008* (2013.01); *F21Y 2115/10* (2016.08)

(58) Field of Classification Search
CPC ...... A63H 27/00; A63H 27/12; F12V 33/008; B64C 27/006; B64C 27/08; B64C 27/10
USPC ...................................................... 446/35–42
See application file for complete search history.

(56) References Cited

U.S. PATENT DOCUMENTS

| | | | | |
|---|---|---|---|---|
| 2004/0140396 | A1 | 7/2004 | Spector | |
| 2005/0014439 | A1 | 1/2005 | Erickson et al. | |
| 2008/0207081 | A1 | 8/2008 | Erickson et al. | |
| 2017/0209799 | A1* | 7/2017 | Shiu | A63H 27/001 |
| 2018/0362133 | A1* | 12/2018 | Toyama | B64D 47/08 |
| 2019/0009876 | A1* | 1/2019 | Toyama | B64C 39/024 |
| 2021/0114730 | A1* | 4/2021 | MacDonald | B64C 39/024 |

* cited by examiner

*Primary Examiner* — Kien T Nguyen
(74) *Attorney, Agent, or Firm* — Zhigang Ma

(57) ABSTRACT

A quadcopter toy is provided, including a fuselage main body, four rotor units, and a circular decorative ring, wherein the circular decorative ring is fixedly connected to a horizontal rotating shaft; the horizontal rotating shaft passes through the fuselage main body; two locating pieces are arranged at an eccentric position of one of the transmission gears; a pawl that cooperates with the two locating pieces is mounted in the fuselage main body; and the pawl does not block clockwise rotation of the locating pieces around a central axis of the transmission gear, but blocks anticlockwise rotation of the locating pieces around the central axis of the transmission gear. The circular decorative ring is provided with a light-emitting diode (LED) strip. The LED strip of the present disclosure can rotate and can stop at fixed points, which improves the fun of the toy.

7 Claims, 10 Drawing Sheets

QUADCOPTER TOY

TECHNICAL FIELD

The present disclosure relates to the technical field of toys, and in particular, to a quadcopter toy.

BACKGROUND

A quadcopter toy includes a fuselage main body and four rotor units. Each rotor unit includes a rotor and a motor that drives the rotor to rotate. By changing speeds of the motors of the various rotor units, an attitude of the toy can be adjusted, and a driving force of flight is obtained.

The quadcopter toy has already appeared for many years. In order to increase the fun and avoid the aesthetic fatigue, merchants always try to give it new functions and new playing methods. One method is to add a light-emitting diode (LED) strip to the quadcopter toy. For example, in a quadcopter toy disclosed in Chinese invention patent No. CN214714347U, an edge of a fuselage main body stand is an annular border. LED lamps are mounted on the annular border. In this way, during night flight, an LED strip emits colorful light that appears very gorgeous.

However, the above-mentioned LED strip is stationary relative to the fuselage main body stand, so the fun needs to be improved.

SUMMARY

The present disclosure aims to provide a quadcopter toy to overcome the above shortcomings. An LED strip of the quadcopter toy can rotate and can stop at fixed points, which improves the fun of the toy.

The objectives can be achieved by the following solutions: A quadcopter toy includes a fuselage main body; and four rotor units arranged around the fuselage main body, wherein each rotor unit includes a rotor, a rotor motor for driving the rotor to rotate, and a rotating shaft of the rotor is vertical; the quadcopter toy further includes a circular decorative ring, wherein the circular decorative ring is fixedly connected to a horizontal rotating shaft; the horizontal rotating shaft passes through the fuselage main body, and an extension direction of the horizontal rotating shaft is a diameter direction of the circular decorative ring; a main motor and a transmission mechanism which drive the horizontal rotating shaft to rotate are also arranged inside the fuselage main body; the fuselage main body and the four rotor units are located inside a spherical space surrounded by a rotation trajectory of the circular decorative ring; the transmission mechanism includes several transmission gears; two locating pieces are arranged at an eccentric position of one of the transmission gears; distances from the two locating pieces to a center point of the transmission gear are the same; a pawl that cooperates with the two locating pieces is mounted in the fuselage main body; the pawl does not block clockwise rotation of the locating pieces around a central axis of the transmission gear, but blocks anticlockwise rotation of the locating pieces around the central axis of the transmission gear; when a first locating pin rotates anticlockwise around the central axis of the transmission gear until the first locating pin is in contact with a tail end of the pawl and stops, a plane where a center line of the circular decorative ring is located is parallel to an extension direction of the rotating shaft of the rotor; and when a second locating pin rotates anticlockwise around the central axis of the transmission gear until the second locating pin is in contact with the tail end of the pawl and stops, the plane where the center line of the circular decorative ring is located is perpendicular to the extension direction of the rotating shaft of the rotor.

The horizontal rotating shaft is connected to a potentiometer; the quadcopter toy further includes a central processing unit; the potentiometer is connected to the central processing unit; and the central processing unit is connected to the main motor.

The circular decorative ring is provided with a light-emitting diode (LED) strip.

A circular metal bushing further sleeves the horizontal rotating shaft; the circular metal bushing is divided into two sections; the two sections of circular metal bushings are respectively located on two opposite sides of a center of the fuselage main body; the two sections of circular metal bushings are used as conductor wires of the LED strip; a positive electrode and a negative electrode of the LED strip are respectively connected to the two sections of circular metal bushings; an LED strip power supply and two electric brushes are mounted inside the fuselage main body; the first electric brush is electrically connected to a positive electrode of the LED strip power supply, and the second electric brush is electrically connected to a negative electrode of the LED strip power supply; the first electric brush is in contact with and presses a circumferential surface of a first section of circular metal bushing; and the second electric brush is in contact with and presses a circumferential surface of a second section of circular metal bushing.

The locating pieces are circular locating pins.

The present disclosure has the following advantages and effects:

I. In a normal state of flight, the main motor drives the circular decorative ring to rotate clockwise rapidly relative to the fuselage main body. Furthermore, the circular decorative ring can be provided with the LED strip, so that the entire quadcopter toy looks like a big standard spherical flyball, which is novel, interesting, and attractive.

II. The circular decorative ring can also stop at the fixed points. In a state at the first stop point, the circular decorative ring (the plane where the center line is located) is in a horizontal state. This state is convenient for the quadcopter toy to land on the ground. In a state at the second stop point, the circular decorative ring (the plane where the center line is located) is in an upright posture, which is like a large circular ring hung in the air. It is also very spectacular. Due to mechanical positioning, the positioning is precise and reliable.

III. The horizontal rotating shaft is connected to the potentiometer. The potentiometer detects the rotation angle of the horizontal rotating shaft. Based on this, it can be inferred whether the circular decorative ring after the anticlockwise rotation is in a horizontal posture or a vertical posture. A central controller determines, according to a final posture that is required by the circular decorative ring, a moment at which the main motor drives the horizontal rotating shaft and the circular decorative ring to rotate anticlockwise.

DETAILED DESCRIPTION OF THE EMBODIMENTS

Figure 1:
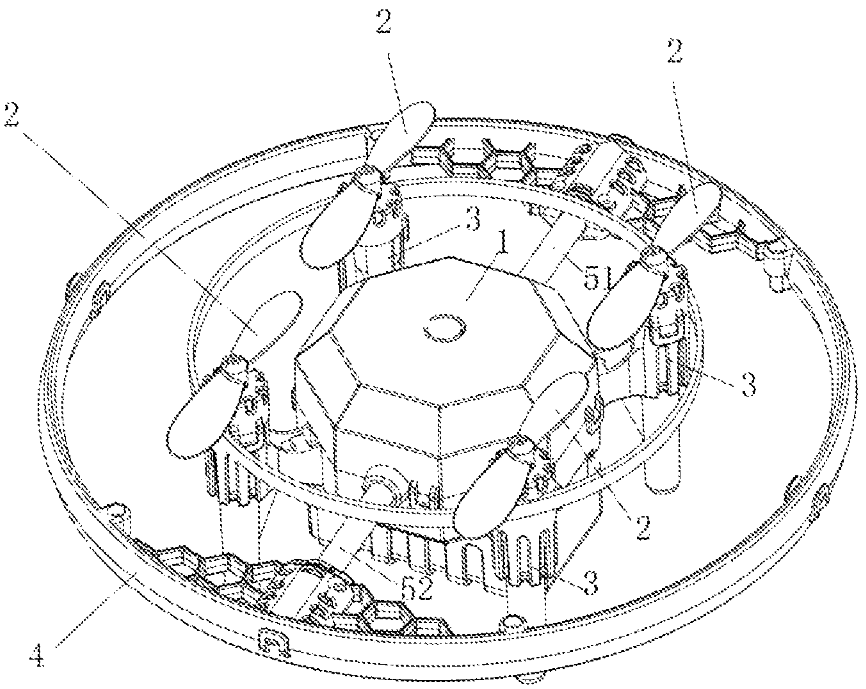
FIG. 1 is a schematic three-dimensional diagram when a plane where a center line of a circular decorative ring is in a horizontal state according to a specific embodiment of the present disclosure.

A quadcopter toy shown in FIG. 1, FIG. 2, FIG. 3, and FIG. 4 includes a fuselage main body 1, and four rotor units arranged around the fuselage main body, wherein each rotor unit includes a rotor 2, a rotor motor 3 for driving the rotor to rotate, and a rotating shaft 20 of the rotor 2 is vertical. The quadcopter toy further includes a circular decorative ring 4, wherein the circular decorative ring 4 is fixedly connected to a horizontal rotating shaft 5; the horizontal rotating shaft 5 passes through the fuselage main body 1, and an extension direction of the horizontal rotating shaft 5 is a diameter direction of the circular decorative ring 4; a main motor 6 and a transmission mechanism which drive the horizontal rotating shaft 5 to rotate are also arranged inside the fuselage main body 1; and the fuselage main body 1 and the four rotor units are located inside a spherical space surrounded by a rotation trajectory of the circular decorative ring 4 (the spherical space is for example a space surrounded by a dotted circle in FIG. 5).

Figure 3:
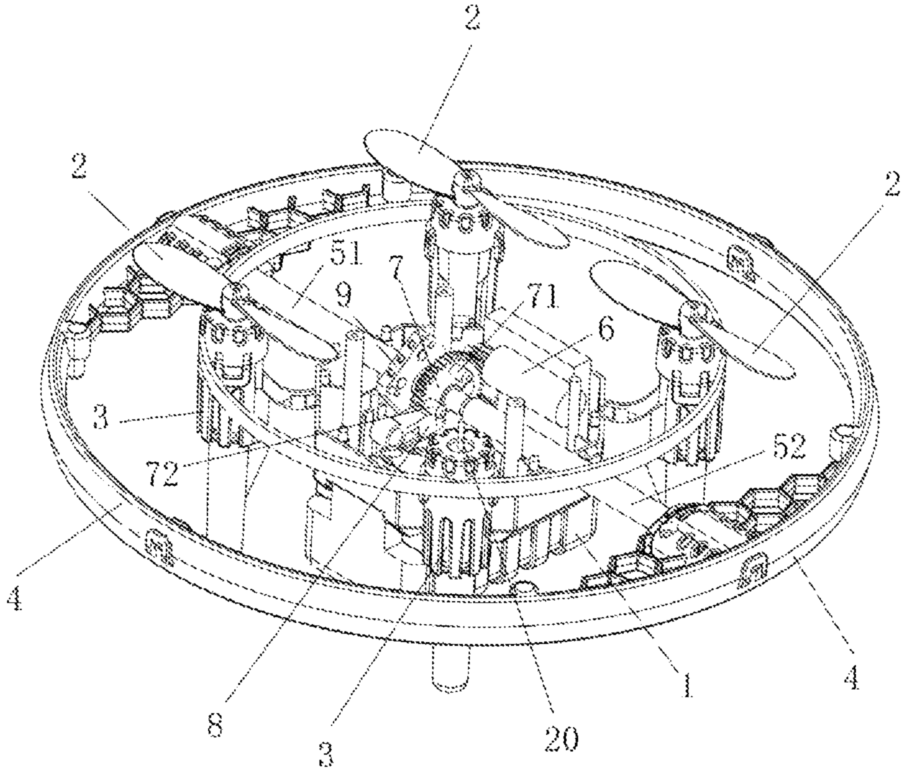
FIG. 3 is a schematic diagram of an internal three-dimensional structure of the state shown in FIG. 1.
Figure 5:
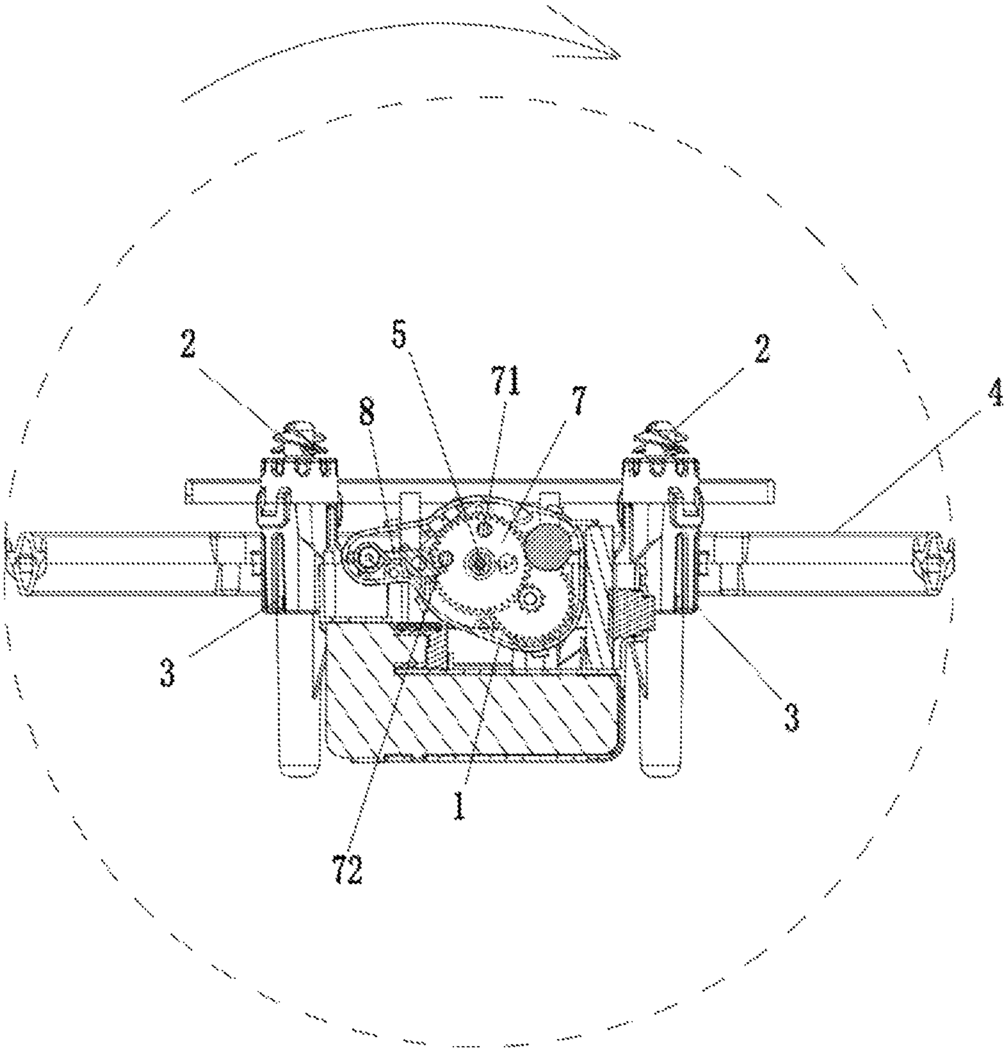
FIG. 5 is a schematic diagram of a cross-sectional structure of B-B in FIG. 4.
Figure 6:
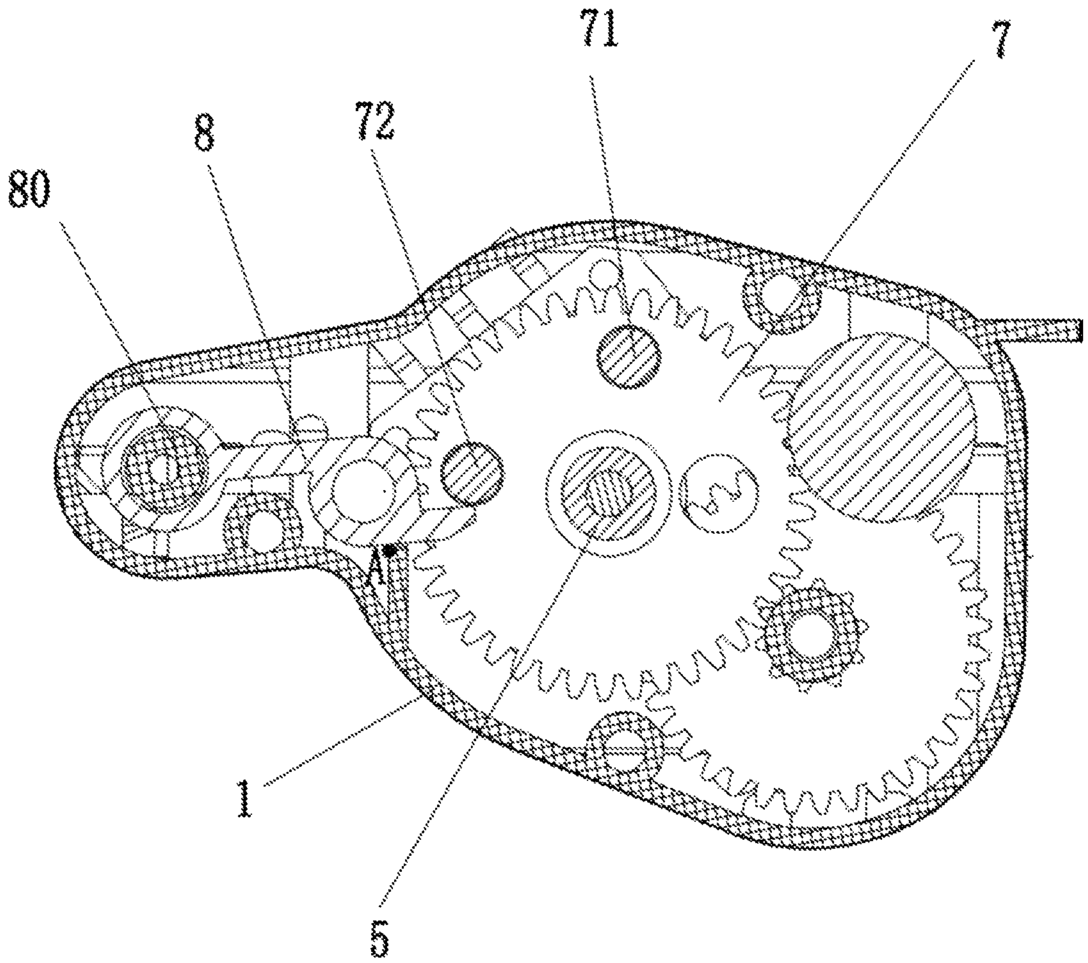
FIG. 6 is a partially enlarged view in FIG. 5.
Figure 7:
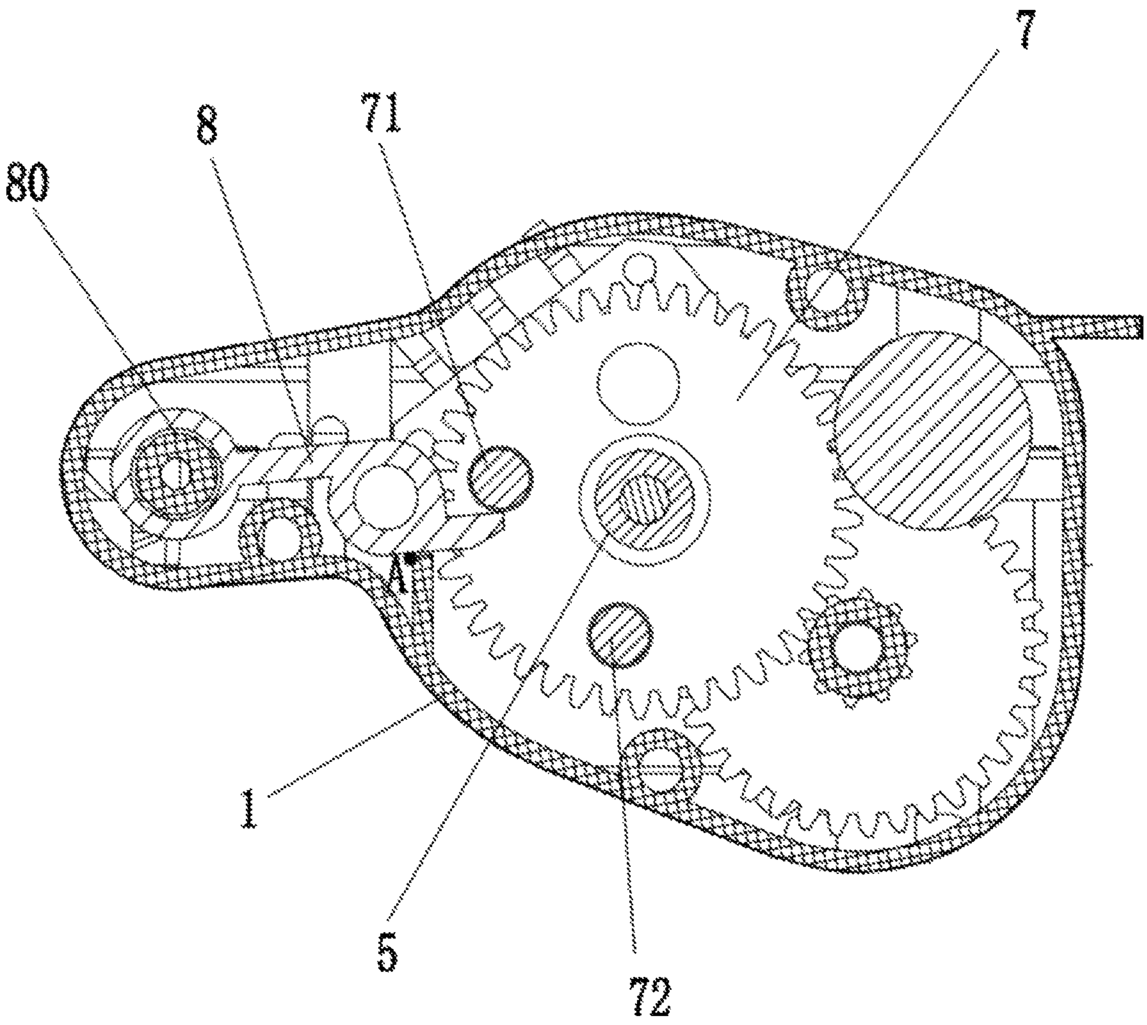
FIG. 7 is a schematic diagram of a changing state of the structure shown in FIG. 6.
Figure 8:
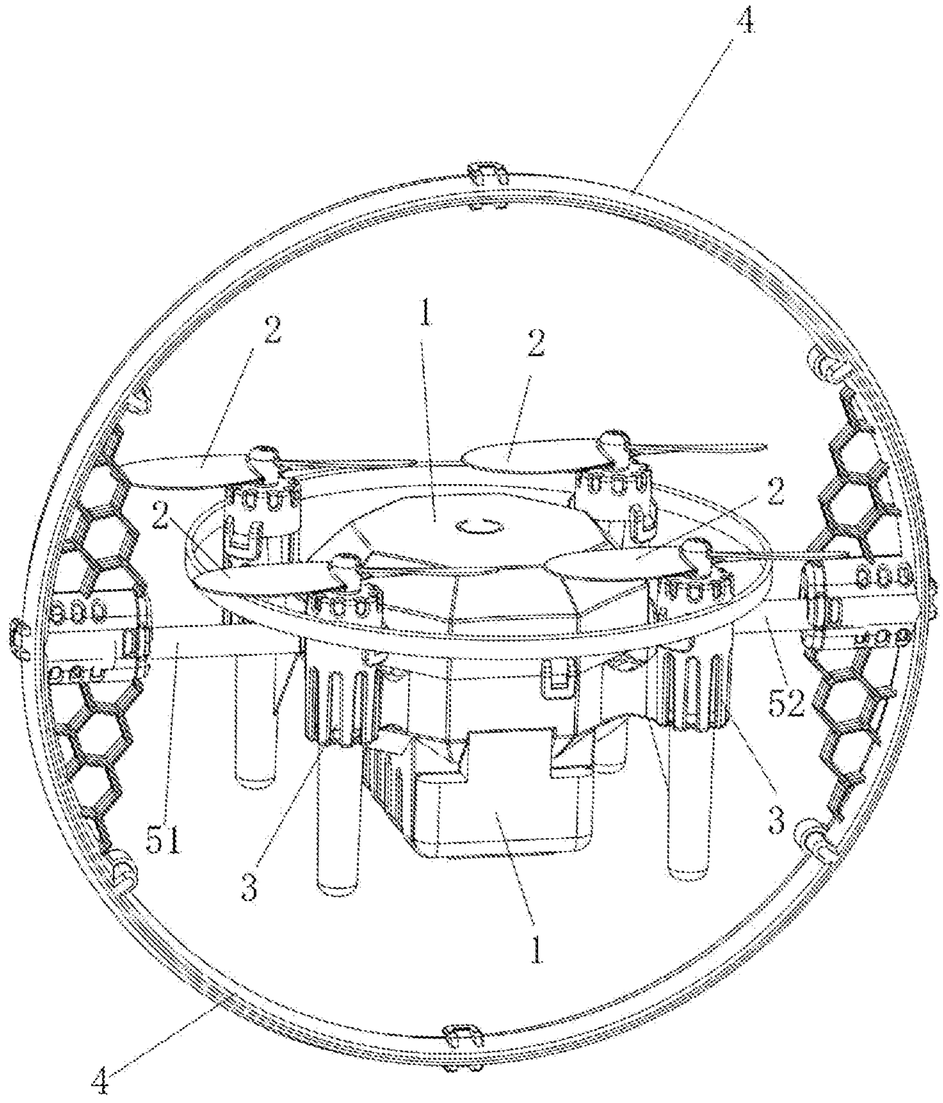
FIG. 8 is a schematic three-dimensional diagram when a plane where a center line of a circular decorative ring is in a vertical direction according to a specific embodiment of the present disclosure.

As shown in FIG. 3, FIG. 5, and FIG. 6, the transmission mechanism includes several transmission gears; two locating pins, namely a first locating pin 71 and a second locating pin 72, are arranged at an eccentric position of one of the transmission gears 7; distances from the two locating pins to a center point of the transmission gear 7 are the same; a pawl 8 that cooperates with the two locating pins is mounted in the fuselage main body 1; the pawl 8 rotates around a pawl shaft 80; a weak spring that applies a clockwise torque to the pawl 8 is also included; and the pawl 8 does not block clockwise rotation (the clockwise rotation is clockwise rotation in FIG. 5, FIG. 6, and FIG. 7, which is as shown by the arrow in FIG. 5) of the two locating pins around a central axis of the transmission gear, but blocks anticlockwise rotation (the anticlockwise rotation is anticlockwise rotation in FIG. 5, FIG. 6, and FIG. 7) of the two locating pins around the central axis of the transmission gear. When the first locating pin 71 rotates anticlockwise around the central axis of the transmission gear 7 until the first locating pin is in contact with a tail end of the pawl 8 and stops (specifically, because the pawl is in contact with point A of the fuselage main body 1 in FIG. 7 and cannot swing, the anticlockwise rotation of the first locating pin 71 is limited), a plane where a center line of the circular decorative ring 4 is located is parallel to an extension direction of the rotating shaft of the rotor 2, that is, the plane where the center line of the circular decorative ring 4 is located is in a vertical direction (in an upright posture), as shown in FIG. 7 and FIG. 8. When the second locating pin 72 rotates anticlockwise around the central axis of the transmission gear 7 until the second locating pin is in contact with the tail end of the pawl 8 and stops (specifically, because the pawl is in contact with point A of the fuselage main body 1 in FIG. 6 and cannot swing, the anticlockwise rotation of the second locating pin 72 is limited), the plane where the center line of the circular decorative ring 4 is located is perpendicular to the extension direction of the rotating shaft 20 of the rotor 2, that is, the plane where the center line of the circular decorative ring 4 is located is in a horizontal direction, as shown in FIG. 1, FIG. 5, and FIG. 6.

Figure 2:
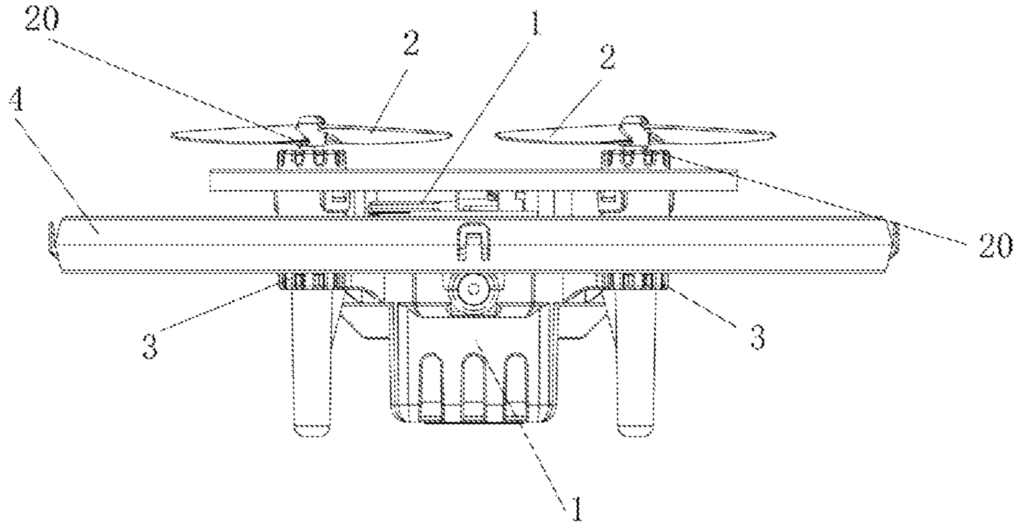
FIG. 2 is a schematic diagram of a front-view structure of the state shown in FIG. 1.
Figure 9:
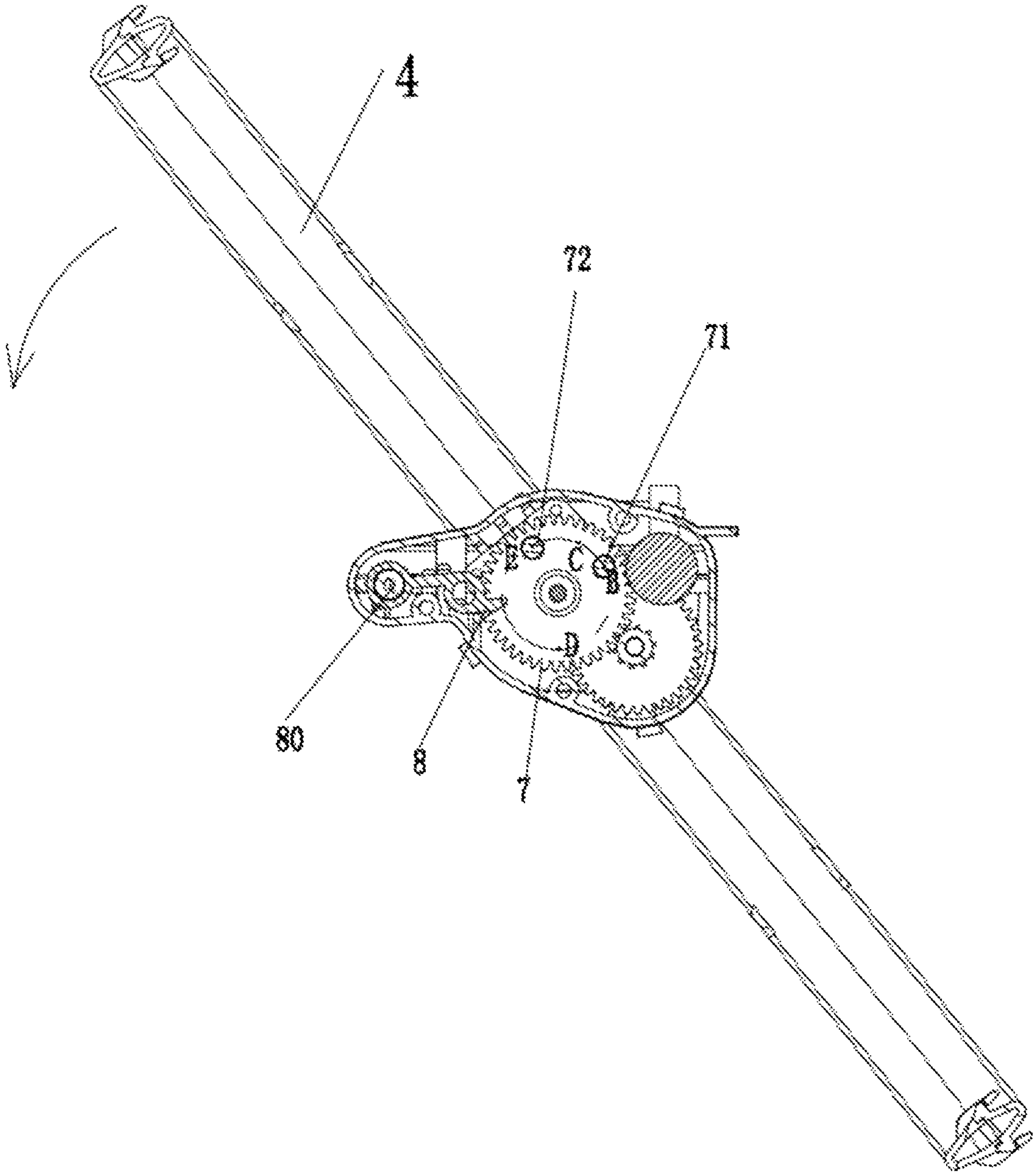
FIG. 9 is an internally schematic diagram of a usage state according to a specific embodiment of the present disclosure.
Figure 10:
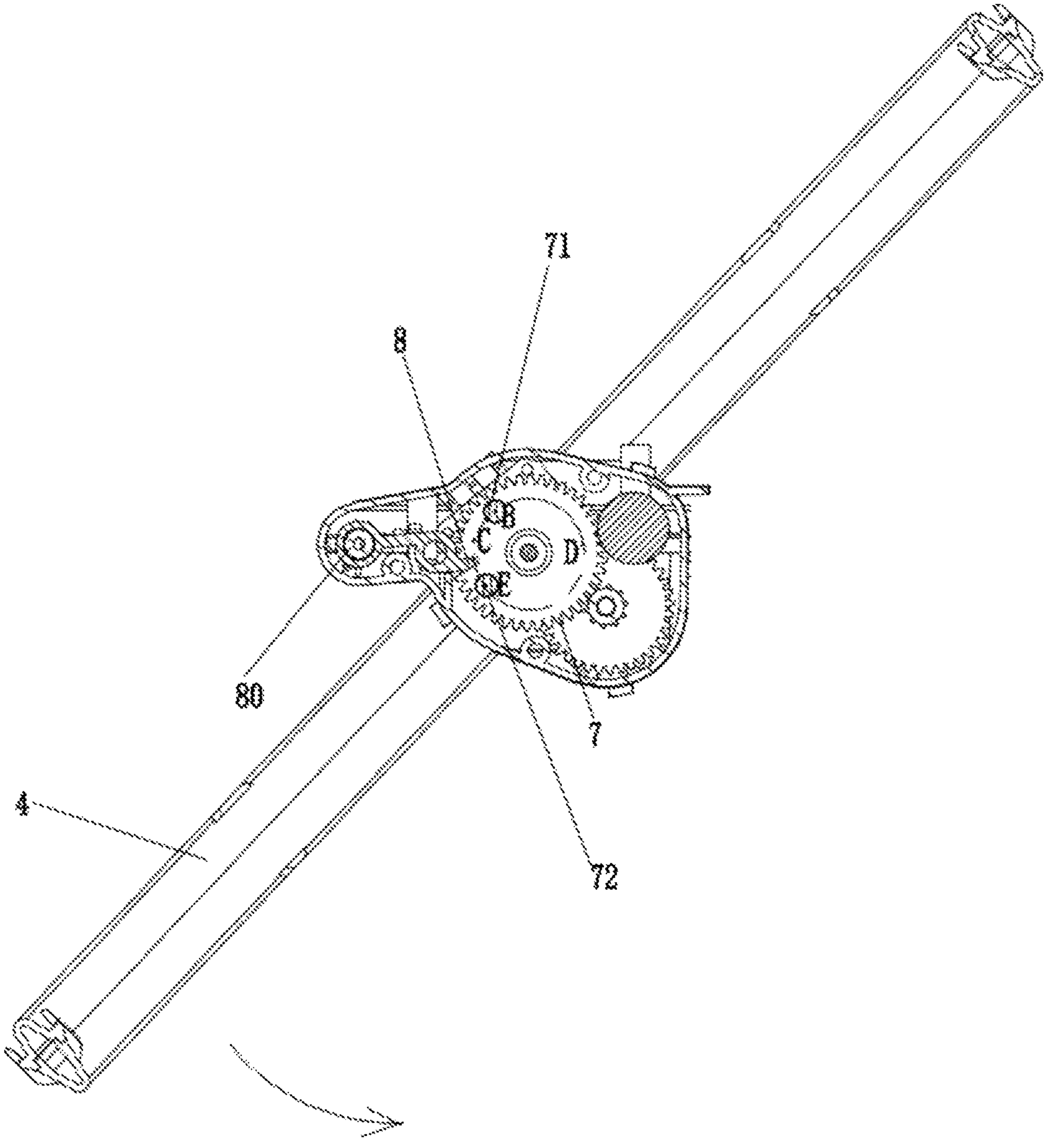
FIG. 10 is an internally schematic diagram of another usage state according to a specific embodiment of the present disclosure.

As shown in FIG. 3, the horizontal rotating shaft 5 is connected to a potentiometer 9; the quadcopter toy further includes a central processing unit; the potentiometer is connected to the central processing unit; and the central processing unit is connected to the main motor 6. In this way, directions where the first locating pin 71 and the second locating pin 72 are in at various moments can be determined according to detection results of the potentiometer 9, so as to infer whether the circular decorative ring 4 is in a horizontal posture or a vertical posture after the anticlockwise rotation. Thus, the central controller can determine, according to a final posture (the horizontal posture or the vertical posture) that is required by the circular decorative ring 4, a moment at which the main motor 6 drives the horizontal rotating shaft 5 and the circular decorative ring 4 to rotate anticlockwise. Specifically, when the circular decorative ring 4 needs to be finally in the horizontal posture (for example, when it needs to land on the ground), a moment at which the pawl 8 is located in an EDB arc range (a 270° arc range) in FIG. 9 is selected to drive the horizontal rotating shaft 5 to start to rotate anticlockwise (as shown by the arrow in FIG. 9), so that the gear 7 will finally stop in the state shown in FIG. 6, and the corresponding posture of the circular decorative ring 4 is the horizontal posture, as shown in FIG. 1 and FIG. 2. When the circular decorative ring 4 needs to finally stop in the upright posture (for example, hanging the circular decorative ring 4 in the air is simulated), a moment at which the pawl 8 is located in a BCE arc range (a 90° arc range) in FIG. 10 is selected to drive the horizontal rotating shaft 5 to start to rotate anticlockwise (as shown by the arrow in FIG. 10), so that the gear 7 will finally stop in the state shown in FIG. 7, and the posture of the circular decorative ring 4 is the upright posture, as shown in FIG. 8.

Figure 4:
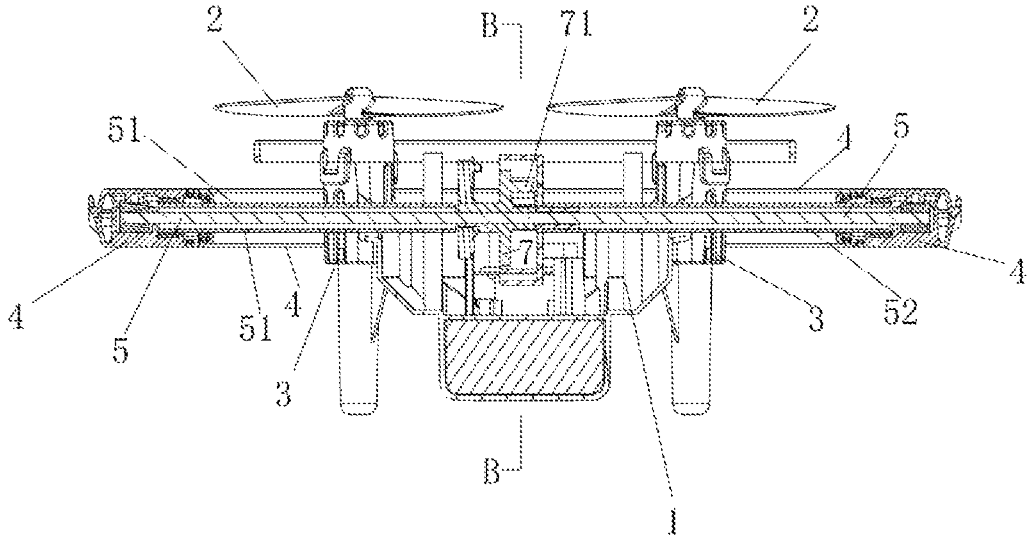
FIG. 4 is a schematic diagram of a cross-sectional structure of the state shown in FIG. 1.

The circular decorative ring is provided with an LED strip. A circular metal bushing further sleeves the horizontal rotating shaft 5; the circular metal bushing is divided into two sections; the two sections of circular metal bushings (a circular metal bushing 51 and a circular metal bushing 52) are respectively located on two opposite sides of a center of the fuselage main body 1, as shown in FIG. 4; the two sections of circular metal bushings (the circular metal bushing 51 and the circular metal bushing 52) are used as conductor wires of the LED strip; a positive electrode and a negative electrode of the LED strip are respectively connected to the circular metal bushing 51 and the circular metal bushing 52; an LED strip power supply and two electric brushes are mounted inside the fuselage main body 1; the first electric brush is electrically connected to a positive electrode of the LED strip power supply, and the second electric brush is electrically connected to a negative electrode of the LED strip power supply; the first electric brush is in contact with and presses a circumferential surface of the first circular metal bushing 51; and the second electric brush is in contact with and presses a circumferential surface of the second circular metal bushing 52.

What is claimed is:

1. A quadcopter toy, comprising a fuselage main body; and four rotor units arranged around the fuselage main body, wherein each rotor unit comprises a rotor, a rotor motor for driving the rotor to rotate, and a rotating shaft of the rotor is vertical; the quadcopter toy further comprises a circular decorative ring, wherein the circular decorative ring is fixedly connected to a horizontal rotating shaft; the horizontal rotating shaft passes through the fuselage main body, and an extension direction of the horizontal rotating shaft is a diameter direction of the circular decorative ring; a main motor and a transmission mechanism which drive the horizontal rotating shaft to rotate are also arranged inside the fuselage main body; the fuselage main body and the four rotor units are located inside a spherical space surrounded by a rotation trajectory of the circular decorative ring; the transmission mechanism comprises several transmission gears; two locating pieces are arranged at an eccentric position of one of the transmission gears; distances from the two locating pieces to a center point of the transmission gear are the same; a pawl that cooperates with the two locating pieces is mounted in the fuselage main body; the pawl does not block clockwise rotation of the locating pieces around a central axis of the transmission gear, but blocks anticlockwise rotation of the locating pieces around the central axis of the transmission gear; when a first locating piece rotates anticlockwise around the central axis of the transmission gear until the first locating piece is in contact with a tail end of the pawl and stops, a plane where a center line of the circular decorative ring is located is parallel to an extension direction of the rotating shaft of the rotor; and when a second locating pin rotates anticlockwise around the central axis of the transmission gear until the second locating pin is in contact with the tail end of the pawl and stops, the plane where the center line of the circular decorative ring is located is perpendicular to the extension direction of the rotating shaft of the rotor.

2. The quadcopter toy according to claim 1, wherein the horizontal rotating shaft is connected to a potentiometer; the quadcopter toy further comprises a central processing unit; the potentiometer is connected to the central processing unit; and the central processing unit is connected to the main motor.

3. The quadcopter toy according to claim 2, wherein the circular decorative ring is provided with a light-emitting diode (LED) strip.

4. The quadcopter toy according to claim 3, wherein a circular metal bushing further sleeves the horizontal rotating shaft; the circular metal bushing is divided into two sections; the two sections of circular metal bushings are respectively located on two opposite sides of a center of the fuselage main body; the two sections of circular metal bushings are used as conductor wires of the LED strip; a positive electrode and a negative electrode of the LED strip are respectively connected to the two sections of circular metal bushings; an LED strip power supply and two electric brushes are mounted inside the fuselage main body; the first electric brush is electrically connected to a positive electrode of the LED strip power supply, and the second electric brush is electrically connected to a negative electrode of the LED strip power supply; the first electric brush is in contact with and presses a circumferential surface of a first section of circular metal bushing; and the second electric brush is in contact with and presses a circumferential surface of a second section of circular metal bushing.

5. The quadcopter toy according to claim 1, wherein the circular decorative ring is provided with a light-emitting diode (LED) strip.

6. The quadcopter toy according to claim 5, wherein a circular metal bushing further sleeves the horizontal rotating shaft; the circular metal bushing is divided into two sections; the two sections of circular metal bushings are respectively located on two opposite sides of a center of the fuselage main body; the two sections of circular metal bushings are used as conductor wires of the LED strip; a positive electrode and a negative electrode of the LED strip are respectively connected to the two sections of circular metal bushings; an LED strip power supply and two electric brushes are mounted inside the fuselage main body; the first electric brush is electrically connected to a positive electrode of the LED strip power supply, and the second electric brush is electrically connected to a negative electrode of the LED strip power supply; the first electric brush is in contact with and presses a circumferential surface of a first section of circular metal bushing; and the second electric brush is in contact with and presses a circumferential surface of a second section of circular metal bushing.

7. The quadcopter toy according to claim 1, wherein the locating pieces are circular locating pins.

* * * * *